US012500839B2

(12) United States Patent
Mathew et al.

(10) Patent No.: US 12,500,839 B2
(45) Date of Patent: Dec. 16, 2025

(54) UNDERLAY-BASED TCP SEGMENTATION OFFLOAD IN OVERLAY NETWORKS

(71) Applicant: VMware LLC, Palo Alto, CA (US)

(72) Inventors: Subin Cyriac Mathew, Palo Alto, CA (US); Boon Seong Ang, Palo Alto, CA (US); Wenyi Jiang, Palo Alto, CA (US); Chidambareswaran Raman, Sunnyvale, CA (US); Jerome Catrouillet, Palo Alto, CA (US); Sichen Song, Palo Alto, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/225,638

(22) Filed: Jul. 24, 2023

(65) Prior Publication Data

US 2025/0039094 A1   Jan. 30, 2025

(51) Int. Cl.
*H04L 47/78*   (2022.01)
*H04L 47/122*  (2022.01)
*H04L 47/125*  (2022.01)

(52) U.S. Cl.
CPC .......... *H04L 47/122* (2013.01); *H04L 47/125* (2013.01); *H04L 47/781* (2013.01)

(58) Field of Classification Search
CPC .... H04L 47/122; H04L 47/125; H04L 47/781
USPC ........................................................ 709/224
See application file for complete search history.

(56) References Cited

U.S. PATENT DOCUMENTS

| | | | | |
|---|---|---|---|---|
| 8,428,087 B1 * | 4/2013 | Vincent | ............... | H04L 47/2483 709/236 |
| 9,641,435 B1 * | 5/2017 | Sivaramakrishnan | ....................... | G06F 9/45558 |
| 2012/0243410 A1 | 9/2012 | Vedula | | |
| 2013/0223337 A1 | 8/2013 | Choo | | |
| 2013/0322255 A1 * | 12/2013 | Dillon | ................. | H04L 41/5025 370/236 |

(Continued)

FOREIGN PATENT DOCUMENTS

CN          116418854         *   3/2023

OTHER PUBLICATIONS

Extended European Search Report, European Application No. 24190414.3 dated Oct. 22, 2024, 10 pages.

*Primary Examiner* — Ario Etienne
*Assistant Examiner* — Kidest Mendaye
(74) *Attorney, Agent, or Firm* — King Intellectual Asset Management

(57) ABSTRACT

Examples described herein include efficient data packet transmission between virtual machines ("VMs") on different hosts. An example method includes generating a large data packet at a source VM and determining a modified maximum segment size for efficient transmission. This modified size replaces the default maximum segment size through a TSO MSS override. Segmentation occurs based on the modified size, and the data segments are transmitted to the destination VM, even if on a different host. Dynamic determination of the modified size optimizes data transmission efficiency and network performance. It accounts for network headers and enables efficient transmission with or without large receiving offload ("LRO") support. Additionally, non-transitory computer-readable media and servers implementing the method are disclosed. These systems and methods achieve streamlined data transmission, improving network performance and reducing processing overhead.

20 Claims, 5 Drawing Sheets

(56) References Cited

U.S. PATENT DOCUMENTS

| | | | |
|---|---|---|---|
| 2014/0056151 A1* | 2/2014 | Petrus | H04L 69/22 |
| | | | 370/242 |
| 2015/0003449 A1 | 1/2015 | Cui | |
| 2015/0139232 A1* | 5/2015 | Yalagandula | H04L 63/162 |
| | | | 370/392 |
| 2015/0263968 A1* | 9/2015 | Jain | G06F 9/00 |
| | | | 370/235 |
| 2015/0382240 A1 | 12/2015 | Hecht | |
| 2016/0057070 A1* | 2/2016 | Saxena | H04L 47/365 |
| | | | 370/392 |
| 2019/0132296 A1* | 5/2019 | Jiang | H04L 69/22 |
| 2019/0387079 A1* | 12/2019 | Pismenny | H04L 69/321 |
| 2020/0259758 A1 | 8/2020 | Vytla | |
| 2020/0366527 A1* | 11/2020 | Banerjee | H04L 45/64 |
| 2021/0084125 A1* | 3/2021 | Sabin | H04L 69/166 |
| 2021/0281442 A1* | 9/2021 | Ray | H04L 12/4641 |

* cited by examiner

UNDERLAY-BASED TCP SEGMENTATION OFFLOAD IN OVERLAY NETWORKS

BACKGROUND

Modern computer networks attempt to optimize data transmission efficiency and reduce strain on the system's central processing units ("CPUs") whenever possible. To achieve these goals, network interface cards ("NICs") often employ a feature called Transmission Control Protocol ("TCP") segmentation offload ("TSO"). TSO assists in the efficient packaging and transmission of data packets by offloading the segmentation process from the CPU to the NIC hardware.

TSO is a widely supported feature in modern NICs that helps optimize data transmission in computer networks. By offloading the task of dividing and organizing data packets from the CPU to the NIC hardware, TSO reduces the CPU workload and improves network performance.

However, in certain network environments such as overlay networks, TSO can face limitations. Overlay networks separate the physical network infrastructure from the virtual workloads running on top of it. In such cases, when the physical, or underlay, network has a much larger capacity for data transmission (known as "maximum transmission unit" or "MTU") compared to the overlay network, traditional TSO becomes a bottleneck.

The issue arises because traditional TSO uses a smaller value for the TCP maximum segment size ("MSS") based on the limitations of the overlay network. This results in the generation of a large number of small packets when TSO is performed. Consequently, various components in the network, including physical switches, receiver NICs, and network functions at the receiver's virtualization layer, experience increased processing requirements.

As a result, a need exists for systems and methods that modifies the traditional TSO process based on the capabilities of the underlying physical network. In particular, a need exists for systems and methods for an improved TSO method that dynamically adjusts the TCP maximum segment size based on the underlying physical network, and that maintains transparency of the physical network to the virtual machines ("VMs"), ensuring seamless communication between the VMs and the underlying network infrastructure.

SUMMARY

Examples described herein include systems and methods for efficiently transmitting data packets between virtual machines on different hosts. An example method includes generating a large data packet at a source VM. The method can include determining a modified maximum segment size for the data packet, which can be based on various factors such as the underlying physical network's maximum segment size or a negotiated end-to-end maximum segment size. The modified maximum segment size can replace the default maximum segment size for the data packet, which can be replaced by way of a TSO MSS override. The large data packet can be segmented into data segments based on the modified maximum segment size. These data segments can be transmitted to the destination VM, which can be executing on a different physical host relative to the source VM.

In an example implementation, the determination of the modified maximum segment size and its replacement of the default maximum segment size can be performed dynamically before handling any new large data packet at the source VM. By proactively adjusting the maximum segment size, the method can optimize data transmission efficiency and network performance on the fly, adjusting to the underlying physical network as needed. These adjustments can be made dynamically, such that changes to the underlying physical network are accounted for before additional packets are sent.

In an example embodiment, the modified maximum segment size can account for the headers added by both the underlying network and the overlay network, ensuring accurate segmentation and efficient transmission. Moreover, if the destination VM supports large receiving offload ("LRO"), the transmitted data segments can be processed at the destination VM without the need for resegmentation. Alternatively, in an example where the destination VM does not support LRO, it may require resegmentation at the destination VM. Even in that example, however, throughput would increase by way of fewer packets being sent across the network.

This disclosure also includes example non-transitory, computer-readable media containing instructions that, when executed by a hardware-based processor, perform some or all of the method stages described above and elsewhere herein. In another example, a server is disclosed. The server can include a memory storage including a non-transitory, computer-readable medium comprising instructions, and a hardware-based processor that executes the instructions to carry out stages. The processor can carry out some or all of the method stages described above and elsewhere herein, for example. In some examples, multiple servers are utilized to perform various different stages of the method, as described in conjunction with the drawings, below.

By employing the example systems and methods herein, efficient and streamlined data transmission between VMs on different hosts can be achieved. This can result in improved network performance, reduced processing overhead, and enhanced overall efficiency of data packet delivery.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include efficient data packet transmission between virtual machines ("VMs") on different hosts. An example method includes generating a large data packet at a source VM and determining a modified maximum segment size for efficient transmission. This modified size replaces the default maximum segment size through a TSO MSS override. Segmentation occurs based on the modified size, and the data segments are transmitted to the destination VM, even if on a different host. Dynamic determination of the modified size optimizes data transmission efficiency and network performance. It accounts for network headers and enables efficient transmission with or without large receiving offload (LRO) support. Additionally, non-transitory computer-readable media and servers implementing the method are disclosed. These systems and methods achieve streamlined data transmission, improving network performance and reducing processing overhead.

Modern network interface cards offer a rich set of offload features that reduce the CPU's computational load. TSO and LRO significantly reduce the number of packets processed by the OS networking protocol stack to improve TCP performance. With TSO, the operating system ("OS") networking stack can pass a large TCP send buffer directly to the physical NIC, which splits the buffer into smaller packets based on the MSS of that TCP session. On the other hand, LRO enables NICs to aggregate multiple TCP segments into a single large one before passing them to the OS networking stack.

In the networking environment, traffic from the client VMs can be encapsulated and sent through a physical underlay, which the environment abstracts away from the user to simplify network operations. The users only need to configure the virtual network, or overlay, and the networking environment translates the overlay configuration into a set of underlay data forwarding rules.

TSO can be performed based on the MSS metadata from the VM networking stack, which is not underlay-aware. It is common to have an overlay MTU much smaller than the underlay MTU. As MTU limits the packet size, overlay MTU affects the MSS of an overlay TCP flow. TSO can therefore produce a large number of TCP packets whose size is much smaller than the underlay MTU. Processing a large number of small packets at the receiver can be a burden for its physical NIC and CPU.

Figure 1:
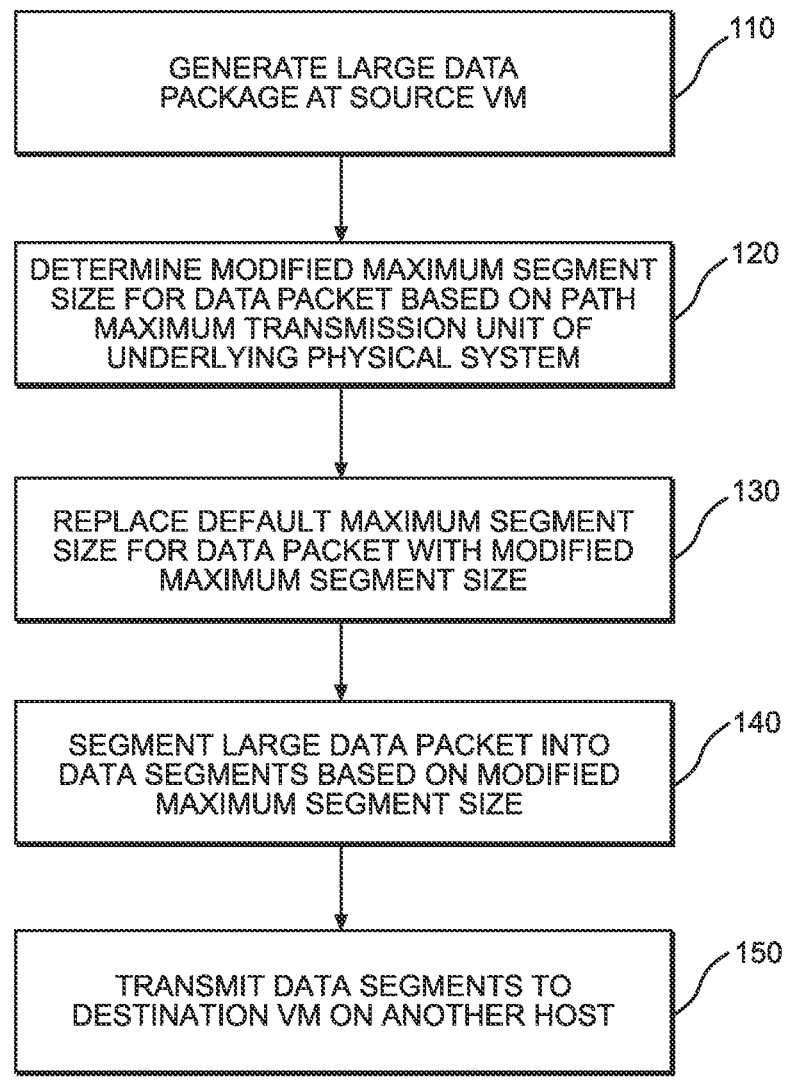
FIG. 1 is a flowchart of an example method for efficiently transmitting data packets between VMs on different hosts.

FIG. 1 provides a flowchart of an example method for efficiently transmitting data packets between VMs on different hosts. Stage 110 can include generating a large data packet a source VM. In the described method, stage 110 involves the handling of a data packet at the source VM that requires transmission to a destination entity, such as another VM within the virtualized environment. While the term "generation" is used in the context of stage 110, it encompasses the action of preparing a received data packet for subsequent transmission rather than implying its creation from scratch at that VM.

During this stage, the source VM generates or receives a large data packet, which can originate from various sources within the virtualized environment or even external systems. This data packet may contain a substantial amount of information or a sizable payload that exceeds the size thresholds typically supported by TCP Segmentation Offload (TSO) methods. More specifically, the data packet may be larger than TCP maximum segment size ("MSS") based on the limitations of the overlay network, even though the physical underlay network might be able to handle the packet size.

In some traditional scenarios, TSO can be performed based on the MSS metadata from the VM networking stack, which traditionally is not underlay-aware. It is common to have an overlay maximum transmission unit (MTU) much smaller than the underlay's MTU. As MTU limits the packet size, overlay MTU affects the MSS of an overlay TCP flow. TSO can therefore produce a large number of TCP packets whose size is much smaller than the underlay MTU. Processing a large number of small packets at the receiver can be a burden for its physical NIC and CPU.

In stage 120 of the disclosed method, a modified MSS for the data packet can be determined based on the path MTU of the underlying physical system. This step involves determining the modified MSS to optimize transmission efficiency within the network infrastructure. For example, the underlying physical system, comprising network components and devices, sets an MTU that specifies the maximum size of individual packets transmitted over the network. Taking this into consideration, the method dynamically determines an appropriate modified MSS for the data packet independent of the overlay limitations, ensuring efficient transmission without fragmentation or data loss.

The determination of the modified MSS accounts for the constraints imposed by the path's MTU. Various techniques and algorithms can be employed in the determination process to determine the modified MSS based on the MTU of the data-routing path of the underlying physical system. One example approach involves probing the network to obtain the MTU, which entails sending test packets with different sizes and analyzing the responses received. By measuring the maximum packet size that can be transmitted without fragmentation or errors, the method can determine the appropriate modified MSS for the data packet.

Additionally, the determination process may utilize preconfigured MTU values specific to the network environment. These values can be predetermined based on the characteristics of the network infrastructure or obtained from network configuration settings. By leveraging these preconfigured MTU values, the method can expedite the determination of the modified MSS, saving time and resources in the process. By determining the MSS based on the path's MTU, the method optimizes transmission efficiency without being constrained by default limits originating from within the virtualized environment.

Stage 130 of the method can include replacing the default MSS for the data packet with the modified MSS determined at stage 120. Stage 130 can be implemented at the hypervisor kernel level, such that the virtualized components running on top of the hypervisor remain unaware of any change in MSS. To be clear, references to the "hypervisor" with respect to this stage are intended to refer to the hypervisor that controls the execution and resource allocation of the source VM. That is, stage 130 can be performed by the hypervisor rather than being performed by a gateway or other external component for handling network-traffic communications.

In addition, although the term "replacing" is used to describe adding a modified MSS, this term is explicitly not intended to necessarily include displacing, deleting, or otherwise removing the original MSS. To the contrary, "replacing" can mean adding the modified MSS to the packet header while leaving the original MSS in place or moving the original MSS to another location in the data packet header—in this example, the modified MSS is replacing the original MSS as the operable MSS for data packet transmission while the original MSS remains in an encapsulation header field of the packet header. While this disclosure mentions of adding or modifying a MSS value to or in "the data packet," it should be understood that such a description includes adding or modifying values within metadata associated with the data packet, such as an encapsulation header, rather than altering the payload of the data packet itself.

By default, the MSS represents the maximum size of a TCP segment within the standard TCP/IP protocol based on the limitations of the overlay network. However, to accommodate the specific requirements and optimizations identified during the previous stages, the method replaces the default MSS with a modified value. The modified MSS reflects the optimized segment size that aligns with the determined path's maximum MTU, but can also include other network characteristics as well. This replacement allows for more efficient transmission and reduces the likelihood of packet fragmentation or unnecessary overhead.

At the hypervisor kernel level, the necessary modifications are made to the network stack or relevant components to ensure that the data packets transmitted by the VMs adhere to the newly set modified MSS. This can include, for example, inserting information into a packet header indicating the modified MSS value. In another example, this stage includes supplying additional metadata that indicates the modified MSS value.

At stage 140, the large data packet can be segmented into smaller data segments based on the modified MSS as previously provided by the hypervisor. Each segment is sized according to the modified MSS established in the previous stages of the method. This segmentation process occurs at a physical uplink component, or components, of the hypervisor and is designed to facilitate efficient transmission of the data within the network by minimizing the number of packets transmitted across the physical network.

For example, if the modified MSS is set to a specific value, the large data packet will be divided into segments of equal or smaller sizes to ensure compliance with the modified MSS. These segments are tailored to fit within the network's maximum MTU and prevent fragmentation or loss of data during transmission.

The segmentation process can take place at one or more physical uplink components of the hypervisor or network infrastructure, which typically include NICs or other network devices responsible for transmitting data between hypervisors residing on different physical servers. These components are equipped with the necessary capabilities to segment the large data packet into smaller data segments based on the modified MSS.

At stage 150 of the example method, the segmented data segments are transmitted from the source host to a destination host that executes the destination VM. The destination host can be a different physical server within the networking environment. This stage of the method involves the transfer of the segmented data over the network to ensure reliable delivery and effective communication between VMs.

The transmission process can follow established networking protocols and mechanisms, such as TCP, for segmenting the original data packet and transmitting the data segments. These protocols ensure the reliable and orderly delivery of the segmented data segments from the source to the destination VM. During transmission, the network infrastructure routes the segmented data segments through various network components, such as switches, routers, and other networking devices. The network infrastructure ensures that the data segments reach the intended destination VM on the other host.

Upon receiving the segmented data segments, the destination VM's physical uplink component(s) reassembles them into the original large data packet. This reassembly process aligns with the modified MSS and ensures that the data is reconstructed accurately. If the destination VM supports LRO, the transmitted data segments can be processed at the destination VM without the need for resegmentation. This can include, for example, restoring the original MSS that is stored in an encapsulation field (or other field) of the header of the data packet. Alternatively, the destination VM does not support LRO, it may require resegmentation at the destination VM. Even in that example, however, overall throughput would increase by way of fewer packets being sent across the network.

In some example networking systems, TSO is not necessarily performed immediately after the VM networking stack sends a large TCP packet with its virtualized network adapter ("vNIC"). Instead, the vNIC of the VM can simply mark the MSS as packet metadata. The packet is then passed to the vSwitch of the hypervisor. TSO is only performed when a large TCP packet is switched to the uplink of the vSwitch. In this example, the packet should already be encapsulated, and the uplink physical NIC of the hypervisor will segment it into a set of smaller packets before transmitting them on the wire. An example of this infrastructure is shown in FIG. 2.

Figure 2:
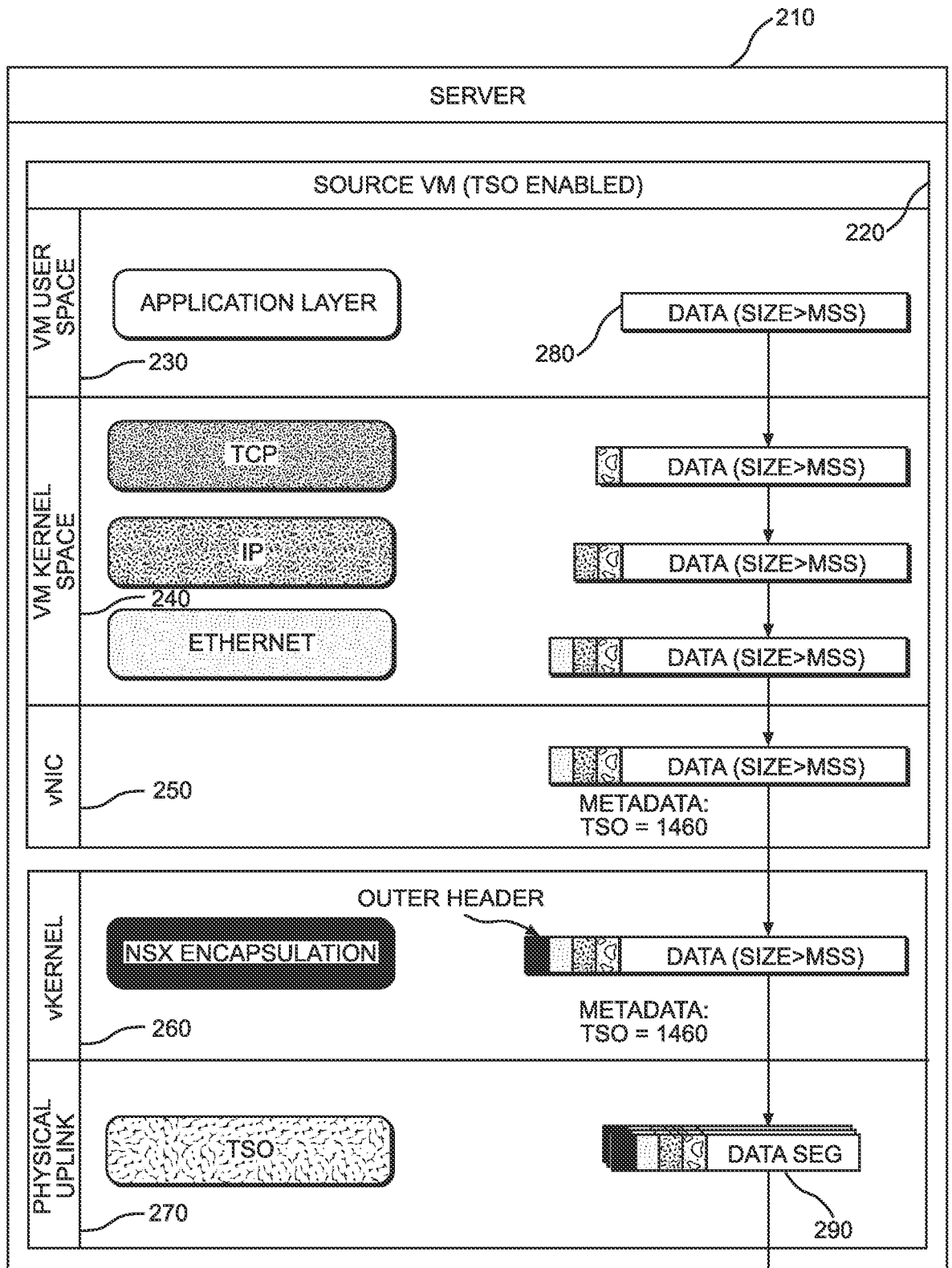
FIG. 2 is a flowchart of an example server sending a data packet using TSO.

In more detail, FIG. 2 depicts a server 210 executing a source VM 220. The source VM 220 includes various components, including a VM user space 230, a VM kernel space 240, and a vNIC 250. The VM user space 230 can represent the portion of the source VM 220 that encompasses the user-level applications, processes, and services. It provides a runtime environment where user applications can execute and interact with the underlying virtualization infrastructure.

In the VM user space 230, various software programs and applications run, enabling users to utilize specific functionalities or services provided by the source VM 220. In the example of FIG. 2, the application layer of the VM user space 230 has generated a data packet 280 with a size that exceeds the MSS associated with the components of the VM 220. This data packet is passed to the VM kernel space 240.

The VM kernel space 240 includes the core operating system components and functionalities that drive the operation of the source VM 220. It hosts the VM kernel, which is responsible for managing system resources, scheduling tasks, handling memory management, and facilitating communication between the user space and the underlying hypervisor or virtualization platform. The VM kernel space 240 provides an essential layer of abstraction and control, enabling the source VM 220 to efficiently utilize the physical resources of the server 210.

As shown, the VM kernel space 240 includes TCP, IP, and Ethernet elements. TCP is responsible for establishing reliable, connection-oriented communication between network endpoints. IP, which stands for Internet Protocol, handles the addressing and routing of data packets across the network. Ethernet, a widely used networking technology, provides the physical transmission and reception of data packets within the network infrastructure. Each of these components can optionally append or modify metadata associated with the data packet 280, as illustrated by the shaded areas added to the lefthand-side of the data packet 280.

The vNIC 250 of FIG. 2 enables network communication between the source VM 220 and other components in the network. It functions as a virtual representation of a physical NIC, allowing the source VM 220 to send and receive data packets over the network. The vNIC 250 acts as the intermediary between the VM kernel space 240 and the underlying physical network infrastructure, providing network connectivity to the source VM 220. It encapsulates network-related operations and protocols, allowing the source VM 220 to seamlessly exchange data with other VMs, physical hosts, or external networks.

FIG. 2 also shows components related to a hypervisor executing on the server 210, including a kernel layer 260 and a physical uplink layer 270. The kernel can be located within the hypervisor and is responsible for managing and overseeing various virtualization functions. In the context of network operations, the kernel layer 260 performs virtual network encapsulation of the data packet 280. This process can include adding an outer header to the data packet 280, encapsulating it within additional metadata that enables virtualized network functionality.

The physical uplink layer 270 can perform TSO, segmenting the data packet 280 into smaller segments 290 of data that fall within an allowable MSS range. The physical uplink layer 270 can be situated at the network interface level. It can segment the data packet 280 into data segments 290 that fall within an allowable MSS range as indicated in the metadata appended to the data packet 280. In this particular example, the MSS for TSO is 1460 bytes, based on the limitations of the virtualized overlay rather than the physical underlay.

After the physical uplink layer 270 performs TSO and creates appropriately sized data segments 290, it can transmit those data segments 290 across the network to another server hosing a destination VM.

Figure 3:
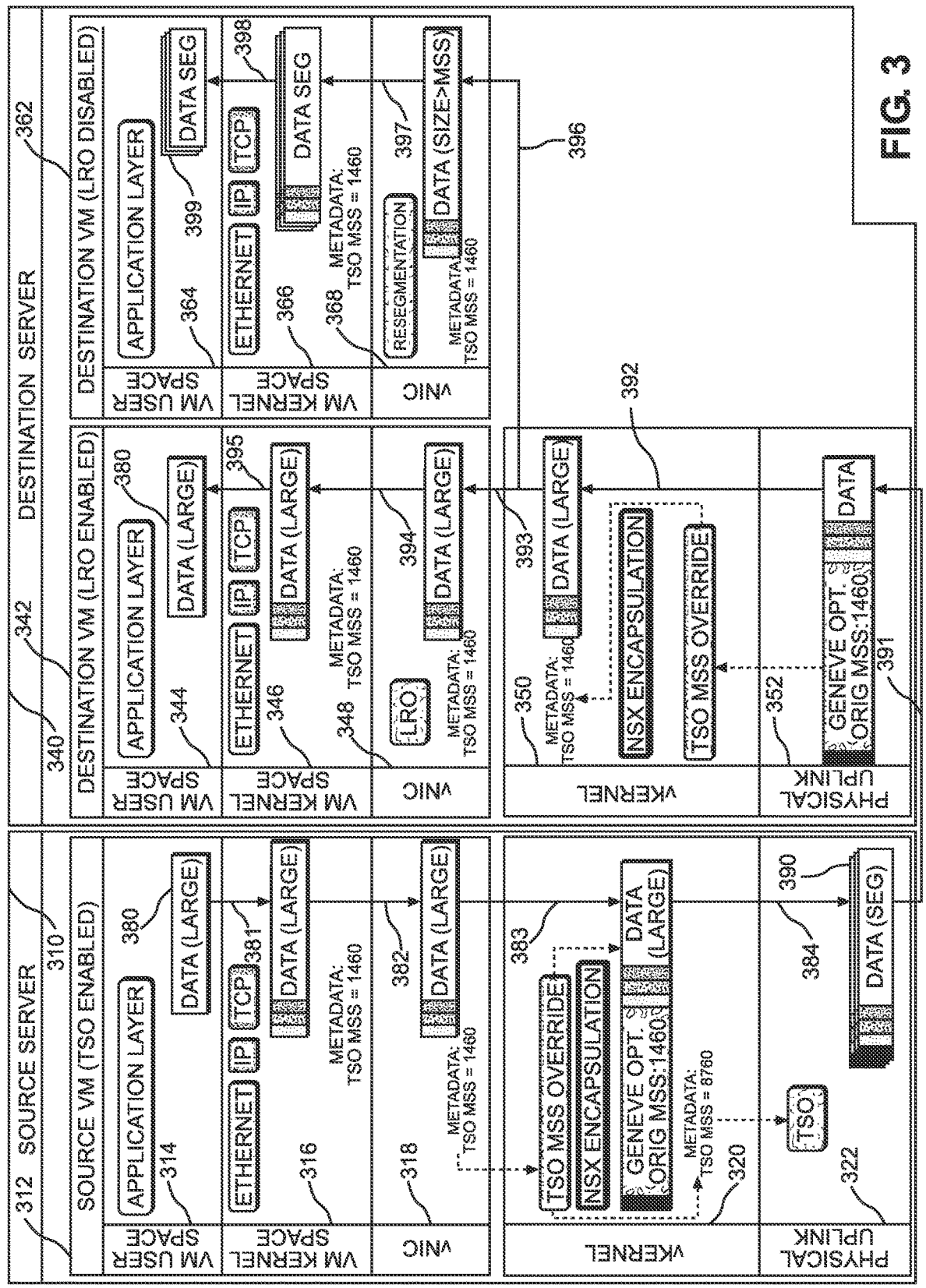
FIG. 3 is a flowchart of an example method for efficiently transmitting data packets between VMs on different hosts.

While the example of FIG. 2 involves using a TSO MSS based on the limitations of the virtualized overlay, FIG. 3 provides an example that includes modifying the MSS based on the capabilities of the physical underlay.

In more detail, FIG. 3 depicts a source server 310 and a destination server 340. The source server 310 includes a source VM 312, which generates data to be sent elsewhere. Destination server 340 includes two different destinations VMs 342, 362. One destination VM 342 is LRO enabled, which allows it to process large data packets. Meanwhile, destination VM 362 is LRO disabled, meaning it cannot process the same size data packets, and instead requires further segmentation of data packets before processing. The example of FIG. 3 provides examples of sending data from a source VM 312 to both of the destination VMs 342, 362.

The various VMs 312, 342, 362 shown in FIG. 3 include various respective components, including a VM user space 314, 344, 364, a VM kernel space 318, 346, 366, and a vNIC 318, 348, 368. The VM user space 314, 344, 364 can represent the portion of the VM 312, 342, 362 that encompasses the user-level applications, processes, and services. It provides a runtime environment where user applications can execute and interact with the underlying virtualization infrastructure.

In the VM user space 314, 344, 364, various software programs and applications run, enabling users to utilize specific functionalities or services provided by the respective VM 312, 342, 362. In the example of FIG. 3, the application layer of the source VM's 312 user space 314 has generated a data packet 380 with a size that exceeds the MSS associated with the components of the VM 312. This data packet is passed to the VM kernel space 316.

The VM kernel space 316, 346, 366 includes the core operating system components and functionalities that drive the operation of the respective VMs 312, 342, 362. It hosts the VM kernel, which is responsible for managing system resources, scheduling tasks, handling memory management, and facilitating communication between the user space and the underlying hypervisor or virtualization platform. The VM kernel space 316, 346, 366 provides an essential layer of abstraction and control, enabling the VMs 312, 342, 362 to efficiently utilize the physical resources of the servers 310, 340.

As shown, the VM kernel space 316, 346, 366 includes TCP, IP, and Ethernet elements. TCP is responsible for establishing reliable, connection-oriented communication between network endpoints. IP, on the other hand, handles the addressing and routing of data packets across the network. Ethernet, a widely used networking technology, provides the physical transmission and reception of data packets within the network infrastructure. Each of these components can optionally append or modify metadata associated with the data packet 380 after it is created by the application layer at stage 381. The shaded areas added to the lefthand-side of the data packet 280 are intended to represented appended or modified metadata of the data packet 380 in this example. Similarly, stages 395 and 398 can include processing and removing the metadata as necessary before providing the data packet (or packets) to the respective application layer.

The vNIC 318, 348, 368 of each respective VM 312, 342, 362 enables network communication between the VMs 312, 342, 362 and other components in the network. It functions as a virtual representation of a physical NIC, allowing the VMs 312, 342, 362 to send and receive data packets over the network. The vNIC 318, 348, 368 acts as the intermediary between the VM kernel space 316, 346, 366 and the underlying physical network infrastructure, providing network connectivity to the VMs 312, 342, 362. It encapsulates network-related operations and protocols, allowing the VMs 312, 342, 362 to seamlessly exchange data with other VMs, physical hosts, or external networks. These functions can be represented by stage 382 in the example of the source VM 312, and stages 394 and 397 in the example of the destination VMs 342, 362.

FIG. 3 also shows components related to hypervisors executing on the servers 310, 340, including a kernel layer 320, 350 and a physical uplink layer 322, 352. Each kernel can be located within a respective hypervisor and is responsible for managing and overseeing various virtualization functions. In the context of network operations, the kernel layer 320, 350 performs virtual network encapsulation of the data packet 380. This process can include adding an outer header to the data packet 280, encapsulating it within additional metadata that enables virtualized network functionality. This process can be represented by stage 383, for example.

In the example of FIG. 3, at stage 383 the kernel layer 320 of the hypervisor overrides the TSO MSS previously set in the metadata at stage 381. More specifically, the TSO MSS in this example was originally set to 1460 bytes, similar to the example of FIG. 2. This MSS limit can be implemented based on the limitations of the virtualized overlay components. However, in this example, the physical underlay components are capable of sending larger data packets. As a result, the kernel layer 320 overrides the TSO MSS and sets a new value—in this example, 8760 bytes. The override step can be performed by modifying or inserting new metadata appended to the data packet 380 to create a modified data packet 390. Although the kernel layer 320 includes an element titled "NSX encapsulation," this element can be any overlay module of the kernel layer and is not specific to any particular platform.

The override step at stage 383 can be performed by the hypervisor that controls the execution and resource allocation of the source VM, rather than being performed by a gateway or other external component for handling network-traffic communications. In addition, this step can include creating or modifying packet metadata to include the new MSS value. The new MSS value is then passed to the physical uplink layer as packet metadata. The original MSS can be saved in the encapsulation header so that the packet can be resegmented at the receiver side, such as where the receiving VM does not support LRO.

The modified data packet 390, which can include the new MSS value as packet metadata, can then be passed to the physical uplink layer 322 at stage 384. The physical uplink layer 322 can be the hypervisor software which understands the capabilities of the physical NIC and adjusts the packets based on those capabilities before sending and after receiving the packets to or from the physical NIC. For example, the physical uplink layer 322 is responsible for performing TSO if the physical NIC does not support TSO. If the physical NIC supports TSO, the physical uplink layer will pass the large packet to the physical NIC, but will also inform it of the MSS for that packet, as a buffer descriptor or other form of metadata, so that the physical NIC can perform the TSO.

In this example, at stage 391, the hypervisor of the source VM 310 transmits the modified data packet 390 to the hypervisor of the destination VM 340. The physical uplink layer 352 of the destination VM 340 can then transfer the data packet 390 to the kernel layer 350. At the kernel layer 350 of the receiving hypervisor, the TSO MSS can be overridden again, this time to return the value to its original value as set by the source VM 312. By returning the TSO MSS value to the original value, the MSS modification remains invisible to the VMs 312, 342, 362 involved in the data transmission process.

FIG. 3 shows two variations in an example method depending upon whether the receiving VM 342, 362 supports LRO. For example, if the receiving VM 342 supports LRO, then at stage 393 the kernel layer 350 can transmit data packet 390 in its large form; that is, without segmenting the data packet 390. In that example, the vNIC 348 of the destination VM 342 provides the LRO functionality and handles the data packet 390, passing it to the VM kernel space 346 at stage 394. The data packet 390 can then be stripped of any headers or other metadata that are not required for the application layer, and the resulting data packet 390 can then be passed to the application layer at stage 395. At that point, the transmission procedure is complete for the data packet 380 created at the source VM 312.

In another example, the destination VM 362 does not support LRO. In that example, at stage 396, the kernel space 350 passes the large data packet 390 to the vNIC 368 of the destination VM 362. The vNIC 368 can then segment the data packet 390 into smaller data segments that fall within the TSO MSS of 1460 bytes, as shown. The smaller-sized data segments can then be passed to the VM kernel space 366 at stage 397. These data segments can then be stripped of any headers or other metadata that are not required for the application layer, and the resulting data segments can then be passed to the application layer at stage 398.

Although FIG. 3 shows only one data packet 390 sent between the source server 310 and destination server 340, the method can include sending multiple data packets 390. For example, the overall package of data being sent between the servers 310, 340 can be 2 MB. With a maximum packet size of 1460 byes, this overall data package would require the transmission of 1437 individual packets. But with a maximum packet size of 8760 bytes based on the limits of the physical components involved in the transmission path, the same data packet would require only 240 individual packets. This greatly reduces the load on the physical components in the network and makes data transmission faster and more efficient.

Figure 4:
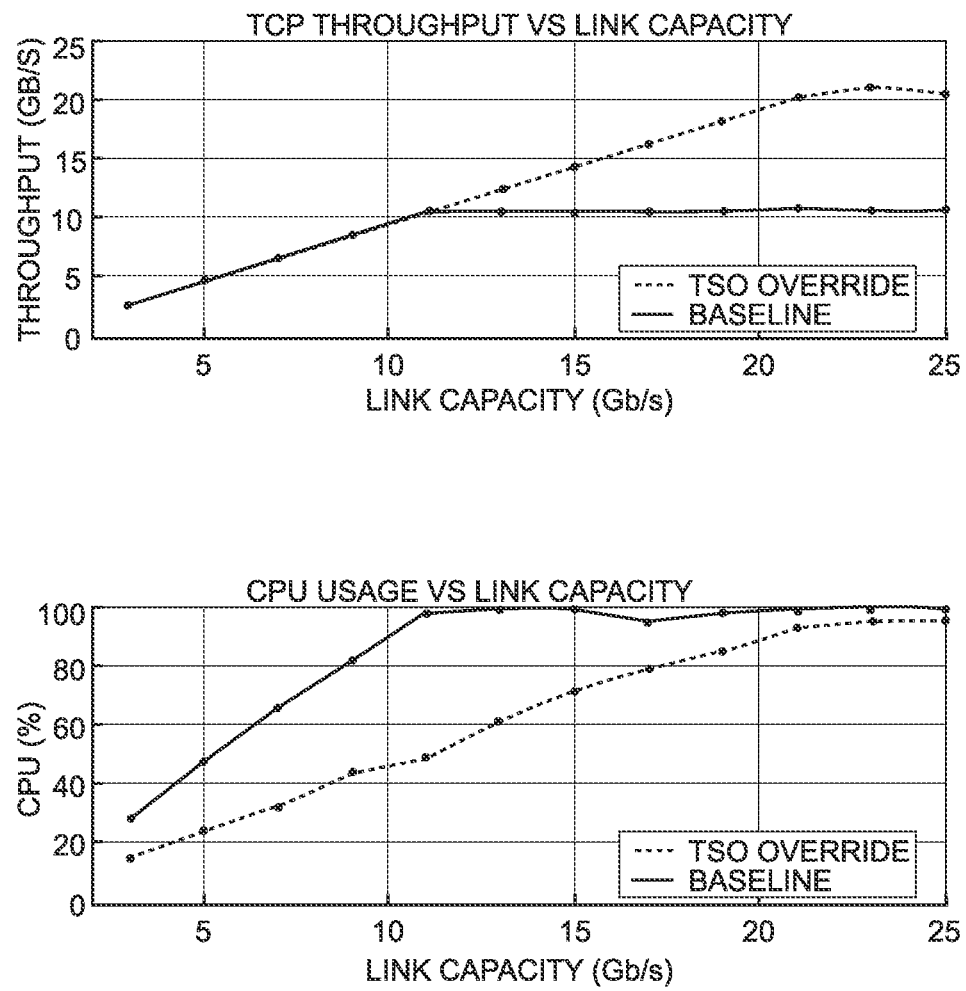
FIG. 4 is a graph showing throughput based on link capacity using the methods described herein versus without using those methods, for a VM that is LRO enabled.

FIG. 4 shows example results from a real-world test of a system as reflected in FIG. 3, with an LRO-enabled destination VM. As the link capacity increases, the system moves from being "network-bounded" to being "CPU-bounded." As shown in the graphs of FIG. 4, before the link capacity reaches 11 Gb/s, both the baseline and the improved design described herein have the TCP throughput reaching the link capacity. Meanwhile, CPU usage gradually increases as throughput increases. The link capacity limits the TCP throughput. In this case, the improved design shows a large CPU usage reduction while achieving the same throughput. For example, at link capacity being 11 Gb/s, both implementations achieve 98% bandwidth utilization. However, the improved design uses 49.6% of a CPU core while the baseline already fully uses CPU.

Dynamic TSO MSS overriding achieves reduced CPU utilization by sending a smaller number of larger packets to the underlay. When encapsulated packets reach the destination hypervisor, each packet must go throughput a set of NSX processing steps, including decapsulation, switching, and applying firewall checks. Thus, a reduced number of packets results in a reduced CPU load. The saved CPU resources can be used by the workload VMs to achieve improved performance.

As the link capacity increases beyond 11 Gb/s, the baseline implementation is limited by the CPU and has its TCP throughput remain at 11 Gb/s. For the improved design, the throughput increases with the link capacity until 21 Gb/s. Afterward, the improved design starts to be bounded by the CPU, and the TCP throughput stays the same.

When both implementations are CPU bounded, the improved design as described herein achieves higher throughput. The existing implementation can achieve at most 11.1 Gb/s while 21.4 Gb/s is achieved with dynamic TSO MSS overriding. More efficient use of the CPU contributes to these throughput improvements.

Figure 5:
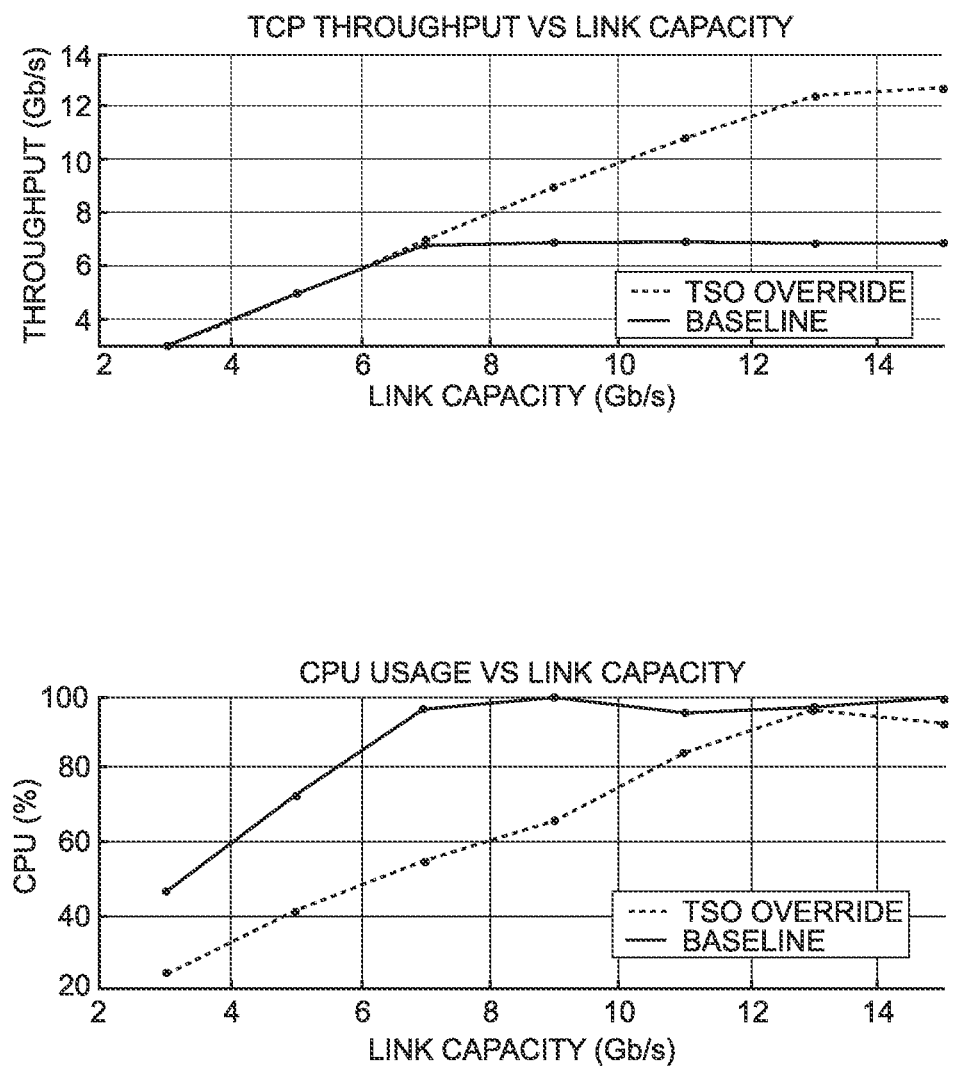
FIG. 5 is a graph showing throughput based on link capacity using the methods described herein versus without using those methods, for a VM that is not LRO enabled.

FIG. 5 shows a similar graph showing results from a similar test, but for a system where LRO is disabled at the destination VM. When the LRO is disabled at the destination VM, each packet passed to its OS networking stack must comply with its MTU, which can be a 1500-byte limit for example. Compared to having LRO enabled, performance decreases due to the increased number of I/O operations. The performance improvement of the improved design over the baseline is also reduced when LRO is disabled, due to the overhead of software-based packet re-segmentation at the vNIC back end. These experiment results when LRO is disabled are shown in FIG. 5.

Nevertheless, the experimental results look similar to those of FIG. 4. That is, compared to the baseline, dynamic TSO MSS overriding reduces the CPU load and can achieve higher throughput. The baseline design is CPU bounded at 6.9 Gb/s while the improved design reaches 12.7 Gb/s. An 84% improvement is achieved. Therefore, disabling LRO reduces the throughput improvement of the improved design from 92% to 84% in the example experiment. The decrease is likely due to software-based re-segmentation only being applied when LRO is disabled. Throughput is still significantly improved in this case, thanks to the reduced number of packets processed by the networking stack at the hypervisor kernel.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method, comprising:
generating a data packet at a source virtual machine (VM) on a source host, the data packet including in a header field a value indicating a default maximum segment size ("default MSS") based on a first maximum transmission unit (MTU) of an overlay network supporting at least the source VM;
receiving the data packet at a hypervisor running on the source host, the hypervisor controlling the execution of the source VM and allocation of resources of the host to the source VM;
determining, by the hypervisor running on the source host and based on a second MTU of an underlay network supporting at least the source VM, a modified maximum segment size ("modified MSS") for the data packet;
replacing, by the hypervisor running on the source host, the default MSS for the data packet with the modified MSS;
initiating, at an uplink layer of the hypervisor running on the source host, segmentation of the data packet into data segments based on the modified MSS; and
transmitting the data segments to the destination VM.

2. The method of claim 1, wherein the modified MSS is determined dynamically independent of any limitations of the overlay network.

3. The method of claim 1, wherein initiating segmentation of the data packet comprises instructing, by the hypervisor, a physical network interface card (NIC) of the source host to perform the segmentation.

4. The method of claim 1, wherein the default MSS is inserted into another portion of the data packet.

5. The method of claim 4, wherein the other portion of the data packet is an encapsulation header field.

6. The method of claim 1, wherein the destination VM is capable of large receiving offload ("LRO"), and wherein the method further comprises, at the destination VM, processing the transmitted data segments without performing resegmentation on those data segments.

7. The method of claim 1, wherein determining and replacing are performed before handling a new data packet generated at the source VM.

8. A non-transitory, computer-readable medium containing instructions executable by a processor to perform operations comprising:
generating a data packet at a source virtual machine (VM) on a source host, the data packet including in a header field a value indicating a default maximum segment size ("default MSS") based on a first maximum transmission unit (MTU) of an overlay network supporting at least the source VM;
receiving the data packet at a hypervisor running on the source host, the hypervisor controlling the execution of the source VM and allocation of resources of the host to the source VM;
determining, by the hypervisor running on the source host and based on a second MTU of an underlay network supporting at least the source VM, a modified maximum segment size ("modified MSS") for the data packet;
replacing, by the hypervisor running on the source host, the default MSS for the data packet with the modified MSS;
initiating, at an uplink layer of the hypervisor running on the source host, segmentation of the data packet into data segments based on the modified MSS; and
transmitting the data segments to the destination VM.

9. The non-transitory, computer-readable medium of claim 8, the modified MSS is determined dynamically independent of any limitations of the overlay network.

10. The non-transitory, computer-readable medium of claim 8, wherein initiating segmentation of the data packet comprises instructing, by the hypervisor, a physical network interface card (NIC) of the source host to perform the segmentation.

11. The non-transitory, computer-readable medium of claim 8, wherein the default MSS is inserted into another portion of the data packet.

12. The non-transitory, computer-readable medium of claim 11, wherein the other portion of the data packet is an encapsulation header field.

13. The non-transitory, computer-readable medium of claim 8, wherein the destination VM is capable of large receiving offload ("LRO"), and wherein the operations further comprise, at the destination VM, processing the transmitted data segments without performing resegmentation on those data segments.

14. The non-transitory, computer-readable medium of claim 8, wherein determining and replacing are performed before handling a new data packet generated at the source VM.

15. A computer system comprising:
one or more processors;
a memory storage including a non-transitory, computer-readable medium comprising instructions executable by the one or more processors to perform operations comprising:
generating a data packet at a source virtual machine (VM) on a source host, the data packet including in a header field a value indicating a default maximum segment size ("default MSS") based on a first maximum transmission unit (MTU) of an overlay network supporting at least the source VM;
receiving the data packet at a hypervisor running on the source host, the hypervisor controlling the execution of the source VM and allocation of resources of the host to the source VM;
determining, by the hypervisor running on the source host and based on a second MTU of an underlay network supporting at least the source VM, a modified maximum segment size ("modified MSS") for the data packet;
replacing, by the hypervisor running on the source host, the default MSS for the data packet with the modified MSS;
initiating, at an uplink layer of the hypervisor running on the source host, segmentation of the data packet into data segments based on the modified MSS; and
transmitting the data segments to the destination VM.

16. The computer system of claim 15, wherein the modified MSS is determined dynamically independent of any limitations of the overlay network.

17. The computer system of claim 15, wherein initiating segmentation of the data packet comprises instructing, by the hypervisor, a physical network interface card (NIC) of the source host to perform the segmentation.

18. The computer system of claim 15, wherein the default MSS is inserted into another portion of the data packet.

19. The computer system of claim 18, wherein the other portion of the data packet is an encapsulation header field.

20. The server of claim 15, wherein the destination VM is capable of large receiving offload ("LRO"), and wherein the method further comprises, at the destination VM, processing the transmitted data segments without performing resegmentation on those data segments.

* * * * *